March 25, 1958     W. E. SCHADE     2,827,835
PETZVAL TYPE PROJECTION OBJECTIVE HAVING
A CONCAVELY CURVED IMAGE SURFACE
Filed May 31, 1956
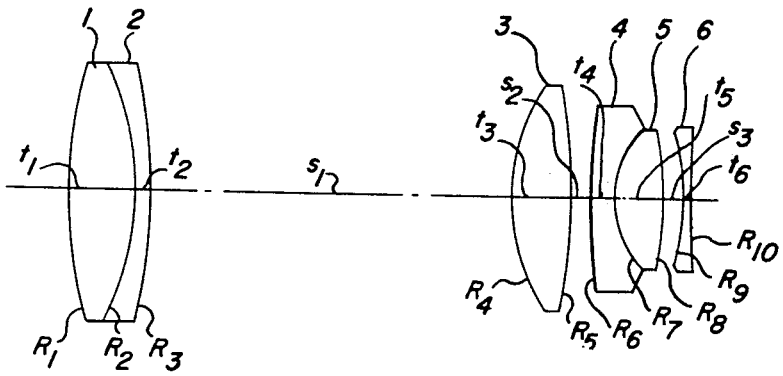
| EF = 100mm | | | | f/1.6 |
|---|---|---|---|---|
| LENS | N | V | RADII | THICKNESSES |
| 1 | 1.5256 | 54.6 | $R_1 = +137.2$ mm | $t_1 = 15.6$ mm |
| 2 | 1.7200 | 29.3 | $R_2 = -66.71$ | $t_2 = 3.9$ |
|  |  |  | $R_3 = -161.1$ | $s_1 = 95.8$ |
| 3 | 1.6968 | 56.2 | $R_4 = +52.82$ | $t_3 = 13.2$ |
|  |  |  | $R_5 = -491.1$ + | $s_2 = 6.5$ |
| 4 | 1.7200 | 29.3 | $R_6 = +259.9$ | $t_4 = 5.2$ |
| 5 | 1.5725 | 42.5 | $R_7 = +23.35$ | $t_5 = 13.0$ |
|  |  |  | $R_8 = -158.7$ | $s_3 = 5.5$ |
| 6 | 1.8037 | 41.8 | $R_9 = -53.33$ | $t_6 = 1.3$ |
|  |  |  | $R_{10} = +440.0$ |  |
WILLY E. SCHADE
INVENTOR.
BY   *Daniel I. Mayne*
*Harold F. Bennett*
ATTORNEY & AGENT

United States Patent Office 2,827,835
Patented Mar. 25, 1958

2,827,835

PETZVAL TYPE PROJECTION OBJECTIVE HAVING A CONCAVELY CURVED IMAGE SURFACE

Willy E. Schade, Rochester, N. Y., assignor to Eastman Kodak Company, Rochester, N. Y., a corporation of New Jersey Application May 31, 1956, Serial No. 588,345

7 Claims. (Cl. 88—57)

This invention relates to projection objectives of large aperture of the so-called Petzval type, sometimes called P-type, and particularly to objectives of this type for use with a concave image field. By "Petzval type" or "P-type" objective broadly is meant an objective comprising two widely separated positive members with or without a negative field-flattening lens therebehind. In the present invention the negative lens is included.

The object of the invention is to provide a high-aperture objective which is corrected for color and the five ordinary aberrations except that the curvature of field is corrected to such a residual value that the image lies on a concave surface with a radius of curvature of the order of magnitude of the focal length of the objective and with a particularly high degree of correction of distortion.

In my earlier patent, No. 2,541,484, I have described a series of P-type lenses with field flatteners in which the image is very highly corrected and lies on a plane surface. In order to define precisely what is meant by the phrase "objective of the Petzval type" or "P-type," my earlier patent sets forth certain characteristics of the objectives described therein. These features are that the objective comprises two positive members made up of a total of from four to seven lens elements and separated by a central air space larger than 0.2 F and smaller than 1.3 F where F is the focal length of the objective, of which the front member is substantially corrected or slightly overcorrected for color, has a focal length between 1.4 F and 2.5 F, and comprises a biconvex element cemented to the front of a negative element whose refractive index is higher than that of the biconvex element by between 0.10 and 0.25 and the second member has a focal length between 0.7 F and 1.5 F, and in which the center of curvature of the front surface of the front member is behind the center of the central air space, the centers of curvature of the surfaces bounding the central air space are outside the body of the objective, and the center of curvature of the rear surface of the second member is outside of the space between the center of the central air space and the principal focal plane. The type of objective in which the present invention is embodied is further restricted to those in which the space between the positive members is greater than 0.5 F and the second member comprises a negative element between two positive elements, at least the rear one of which is cemented to the negative element, and hence there are at least five elements in the two positive members. Objectives according to the present invention also have a field-flattening component with a focal length between —0.4 F and —1.8 F spaced behind the second member and in front of the focal plane.

In connection with the continuous film feed projector described in co-pending application, Serial No. 303,230, filed July 8, 1952, by my colleague, Otto Wittel, now Patent No. 2,780,133, dated February 5, 1957, the need arose for an objective in which the image field is curved with its center of curvature substantially at the exit pupil of the objective to prevent the well-known keystoning aberration common in continuous projectors, and, in addition to having the ordinary aberrations well corrected for sharp imagery on this curved field, it was necessary to have the distortion very highly corrected so as to prevent what might be called keystoning aberrations of the second order. It was also found important to have a high aperture to transmit a sufficiently large amount of light for a television scanning system.

A particular object of the invention accordingly is to provide a high-aperture objective capable of producing a highly corrected image on a curved image surface whose center of curvature is approximately at the exit pupil of the objective, the distortion being particularly well corrected.

At first sight, it appears that it should be rather easy to adapt one of the examples of my earlier patent for use with a concave image field by removing the negative field-flattening component from the rear of the objective with perhaps a slight modification of some of the other radii of curvature. This was not successful, however, because of the barrel-shaped distortion in the short conjugate focal plane caused by the second positive member, which is located at a considerable distance from the aperture stop, and accentuated by the cemented surface of positive power in the second positive member which was a feature of my earlier invention.

According to one form of the present invention, the astigmatism and distortion are highly corrected on the requisite concave image surface by making the negative element of the second component of a glass which has a refractive index higher than that of the biconvex element cemented to the rear thereof by between 0.10 and 0.30 and by the radius of curvature of the cemented surface joining these two elements being between 0.2 F and 0.3 F.

According to a slightly different form of the invention, the second positive member consists of a positive component and a cemented doublet airspaced therebehind by a distance between zero and 0.15 F, the curvature of the rear surface of the positive component is between —0.5 and +0.3 times that of the front surface thereof, the cemented doublet in the second member consists of a negative element cemented to the front of a positive element whose refractive index is lower than that of the negative element, and the radius of curvature of the cemented surface thereof is numerically less than that of either of the other two surfaces of said doublet.

According to a preferred feature of the invention, the negative rear member of the objective consists of a single lens element having a refractive index between 1.7 and 2.0.

According to another preferred feature of the invention the sum of the power of the front surface of said negative element in the second member and that of the rear surface of the element in front of it is between zero and $+0.8/F$.

According to a preferred form of the present invention, an objective is made up of the above-described type in which the front member consists of a front biconvex element and a negative element cemented thereto, the second member consists of a negative element, a biconvex element cemented to the rear thereof and a positive element in front thereof, and the rear member consists of a single negative element.

Preferably the following algebraic equalities hold true:

$$F < +R_1 < 2\ F$$
$$0.55\ F < -R_2 < 0.8\ F$$
$$1.1\ F < -R_3 < 3\ F$$
$$0.45\ F < +R_4 < 0.65\ F$$
$$-0.1 < F/R_5 < +0.5$$

$1.5\ F < R_6 < \infty$ $0.2\ F < +R_7 < 0.3\ F$ $F < -R_8 \leq 5\ F$ $0.4\ F < -R_9 < F$ $1.2 < \left\{\dfrac{F}{R_{10}} - \dfrac{F}{R_9}\right\} < 2.5$ $1.44 < N_1 < 1.60$ $0.10 < (N_2 - N_1) < 0.25$ $1.44 < N_3 < 1.75$ $1.60 < N_4 < 1.84$ $0.10 < (N_4 - N_5) < 0.30$ $1.70 < N_6 < 2.00$ $0.15\ F < (t_1 + t_2) < 0.3\ F$ $0.5\ F < s_1 < 1.3\ F$ $0.12\ F < (t_3 + s_2) < 0.3\ F$ $0.15\ F < (t_4 + t_5) < 0.3\ F$ $0.02\ F < (s_3 + t_6) < 0.15\ F$ Where R denotes the radii of curvature of the lens surfaces, N denotes the refractive indices of the lens elements, $t$ denotes the thicknesses of the lens elements and $s$ denotes the air spaces between the components, each numbered by subscript from front to rear, and F, as before, denotes the focal length of the objective as a whole.

The accompanying drawing shows in diagrammatic axial section an objective according to the invention and constructional data for a specific example thereof having a focal length of 100 mm. This data is as follows:

| Lens | N | V | Radii, mm. | Thicknesses, mm. |
|---|---|---|---|---|
| 1 | 1.5256 | 54.6 | $R_1 = +137.2$ | $t_1 = 15.6$ |
|   |        |      | $R_2 = -66.71$ |              |
| 2 | 1.7200 | 29.3 | $R_3 = -161.1$ | $t_2 = 3.9$  |
|   |        |      |                | $s_1 = 95.8$ |
| 3 | 1.6968 | 56.2 | $R_4 = +52.82$ | $t_3 = 13.2$ |
|   |        |      | $R_5 = -491.1$ |              |
|   |        |      |                | $s_2 = 6.5$  |
| 4 | 1.7200 | 29.3 | $R_6 = +259.9$ | $t_4 = 5.2$  |
|   |        |      | $R_7 = +23.35$ |              |
| 5 | 1.5725 | 42.5 | $R_8 = -158.7$ | $t_5 = 13.0$ |
|   |        |      |                | $s_3 = 5.5$  |
| 6 | 1.8037 | 41.8 | $R_9 = -53.33$ | $t_6 = 1.3$  |
|   |        |      | $R_{10} = +440.0$ |           |

In this table of data, the lens elements are numbered in the first column in order from front to rear, R, N, $t$ and $s$ are as defined above, and V denotes the conventional dispersive index of the respective lens elements.

It is readily seen from this table that the example embodies all the features of the invention except that the specified surface powers are not given. These are $+0.14/F$ for surface 6 and $+0.29/F$ for surface 5, the sum being $+0.43$ in accordance with this feature of the invention. Also, the focal length of the negative rear element is approximately $-0.6\ F$.

By these features I have been able to design a lens which, when made up, proved to be highly satisfactory for the intended use.

I claim:

1. A Petzval type projection lens having a curved image surface concave toward the lens and with a radius of curvature between 0.5 F and 3 F, where F is the focal length of the objective, and highly corrected for color and the five ordinary aberrations with respect to said curved image surface, said objective comprising two positive members made up of a total of from five to seven lens elements and separated by a central airspace larger than 0.5 F and smaller than 1.3 F, of which the front member ranges from substantially corrected to slightly overcorrected for color, has a focal length between 1.4 F and 2.5 F, and comprises a biconvex element cemented to the front of a negative element whose refractive index is higher than that of the biconvex element by between 0.10 and 0.25 and the second member has a focal length between 0.7 F and 1.5 F and comprises a negative element, a biconvex element cemented to the rear thereof and a positive element in front thereof, and in which the center of curvature of the front surface of the front member is behind the center of said airspace, the centers of curvature of the surfaces bounding the central airspace are outside the body of the objective, and the center of curvature of the rear surface of the second member is outside the space between the center of the central airspace and the principal focal point, and comprising in addition a negative member with a focal length between 0.4 F and 1.8 F spaced behind the second member and in front of the focal plane, characterized by the refractive index of said negative element in said second member being higher than that of said biconvex element cemented to the rear thereof by between 0.10 and 0.30 and by the radius of curvature of the cemented surface between said two elements being between 0.2 F and 0.3 F.

2. An objective according to claim 1 further characterized in that said negative rear member consists of a single negative element having a refractive index between 1.70 and 2.00.

3. An objective according to claim 2 further characterized by said positive element in said second member being separated from said negative element by an airspace less than 0.15 F in length and having power between zero and $+0.8/F$.

4. An objective according to claim 1 further characterized by the sum of the power of the front surface of said negative element in the second member and that of the rear surface of the element in front of it being between zero and $+0.8/F$.

5. A Petzval type projection lens having a curved image surface concave toward the lens and with a radius of curvature between 0.5 F and 3 F where F is the focal length of the objective and highly corrected for color and the five ordinary aberrations with respect to said curved image surface, said objective comprising two positive members made up of a total of from five to seven lens elements and separated by a central airspace larger than 0.5 F and smaller than 1.3 F, of which the front member ranges from substantially corrected to slightly overcorrected for color, has a focal length between 1.4 F and 2.5 F, and comprises a biconvex element cemented to the front of a negative element whose refractive index is higher than that of the biconvex element by between 0.10 and 0.25 and the second member has a focal length between 0.7 F and 1.5 F and consists of a negative element, a positive element cemented to the rear thereof and a positive component in front thereof, and in which the center of curvature of the front surface of the front member is behind the center of said airspace, the centers of curvature of the surfaces bounding the central airspace are outside the body of the objective, and the center of curvature of the rear surface of the second member is outside the space between the center of the central airspace and the principal focal point, and comprising in addition a negative member with a focal length between 0.4 F and 2.0 F spaced behind the second member and in front of the focal plane, characterized by the second positive member consisting of a positive component and a cemented doublet component airspaced therebehind, by the curvature of the rear surface of said positive component being between $-0.5$ and $+0.3$ times that of the front surface thereof, by the length of said airspace within said second member being between zero and 0.15 F and by said cemented doublet component consisting of a negative element cemented to the front of a positive element of lower refractive index, the radius of curvature of the cemented surface being numerically less than that of the more strongly curved of the other two surfaces of said doublet.

6. An objective according to claim 5 further characterized in that said negative rear member consists of a single negative element having a refractive index between 1.70 and 2.00.

7. A photographic objective consisting of four axially aligned and airspaced lens components as follows: a positive cemented doublet, a positive singlet, a second cemented doublet and a negative singlet in that order, in which the following algebraic inequalities hold true:

$$F < +R_1 < 2\ F$$
$$0.55\ F < -R_2 < 0.8\ F$$
$$1.1\ F < -R_3 < 3\ F$$
$$0.45\ F < +R_4 < 0.65\ F$$
$$-0.1 < F/R_5 < +0.5$$
$$1.5\ F < +R_6 < \infty$$
$$0.2\ F < +R_7 < 0.3\ F$$
$$F < -R_8 \leq 5\ F$$
$$0.4\ F < -R_9 < F$$
$$1.2 < \left\{\frac{F}{R_{10}} - \frac{F}{R_9}\right\} < 2.5$$
$$1.44 < N_1 < 1.60$$
$$0.10 < (N_2 - N_1) < 0.25$$
$$1.44 < N_3 < 1.75$$
$$1.60 < N_4 < 1.84$$
$$0.10 < (N_4 - N_5) < 0.30$$
$$1.70 < N_6 < 2.00$$
$$0.15\ F < (t_1 + t_2) < 0.3\ F$$
$$0.5\ F < s_1 < 1.3\ F$$
$$0.12\ F < (t_3 + s_2) < 0.3\ F$$
$$0.15\ F < (t_4 + t_5) < 0.3\ F$$
$$0.02\ F < (s_3 + t_6) < 0.15\ F$$

where R denotes the radii of curvature of the optical surfaces, N the refractive indices of the optical elements, $s$ the axial spaces between components and $t$ the axial thicknesses of the lens elements, each numbered by subscripts from front to rear, and F denotes the focal length of the objective as a whole, and in which the principal focal point lies behind said negative singlet.

References Cited in the file of this patent
UNITED STATES PATENTS

| | | |
|---|---|---|
| 1,843,519 | Richter | Feb. 2, 1932 |
| 2,076,190 | Wood | Apr. 6, 1937 |
| 2,187,780 | Gehrke et al. | Jan. 23, 1940 |
| 2,445,594 | Bennett | July 20, 1948 |
| 2,541,484 | Schade | Feb. 13, 1951 |